United States Patent [19]

Sarokhanian

[11] Patent Number: 4,982,442

[45] Date of Patent: Jan. 1, 1991

[54] LOW COST ANTENNA SWITCH USING RELAYS CONFIGURED IN A TRANSMIT/RECEIVE ARRANGEMENT

[75] Inventor: Hamlet Sarokhanian, Ft. Worth, Tex.

[73] Assignee: Motorola, Inc., Schaumburg, Ill.

[21] Appl. No.: 342,834

[22] Filed: Apr. 25, 1989

[51] Int. Cl.⁵ .......................... H04B 1/48; H01P 1/10
[52] U.S. Cl. .......................... 455/83; 455/78; 455/82; 333/101; 333/105
[58] Field of Search .................. 333/101, 103–105; 455/78, 82, 83; 370/38

[56] References Cited

U.S. PATENT DOCUMENTS

| | | | |
|---|---|---|---|
| 2,958,054 | 10/1960 | Concelman | 333/105 |
| 3,117,241 | 1/1964 | Paynter et al. | 333/103 X |
| 3,372,349 | 3/1968 | Concelman | 333/105 |
| 3,373,360 | 3/1968 | Wilson | 333/105 X |
| 4,492,937 | 1/1985 | Theriault | 333/103 |
| 4,542,300 | 9/1985 | Nagatomi | 333/103 X |

FOREIGN PATENT DOCUMENTS 801062  10/1956  United Kingdom ................ 333/101

Primary Examiner—Benny T. Lee
Attorney, Agent, or Firm—Joseph P. Krause

[57] ABSTRACT

An antenna switch using two low-cost relays substantially improves isolation of signals from a transmitter to a receiver by connecting an impedance across the input of a receiver during transmit. During receive, the transmitter is disconnected from the antenna while the receiver is connected.

6 Claims, 1 Drawing Sheet

LOW COST ANTENNA SWITCH USING RELAYS CONFIGURED IN A TRANSMIT/RECEIVE ARRANGEMENT

BACKGROUND OF THE INVENTION

This invention relates to RF antenna switches. In particular, this invention relates to relays used as RF antenna switches at frequencies up to 800 MHz.

An RF relay used as an antenna switch is typically a single pole, double throw relay, having the common contact switched between two contacts by an armature. When the armature is in a first position, one switch contact is connected to the common contact. With the armature in the other position, the other switch contact is connected to the common contact. To use a single pole double throw relay as an antenna switch, therefore, the antenna would normally be connected to the common node and the transmitter and receiver connected to the appropriate switch contacts.

During transmit mode, RF energy from the transmitter can leak to the receiver by virtue of stray capacitance existing in the relay. As the reactance of stray capacitance between the receiver and transmitter decreases, and as the frequency of the RF energy increases, the signal leaked to the receiver from the transmitter increases possibly reaching levels sufficient to damage the receiver's components. The level of signal coupled to the receiver from the transmitter in an antenna switch is often expressed in decibels as the isolation loss. The higher the isolation loss of an antenna switch, the greater the isolation of the transmitter signal from the receiver.

Many physical characteristics affect isolation loss in a relay. As the physical size of RF relays used for antenna switches decreases the coupling between a transmitter and a receiver increases, decreasing the isolation loss of the relay. Other factors such as dielectric selection, spacing between the contacts, and configuration of electrodes used to fabricate the relay can also affect isolation loss.

In many circuits, miniaturization is important. Small relays are frequently used to switch transmitters and receivers between the antenna. There are many compact RF relays suitable for printed circuit applications that have relatively high isolation losses. The principal drawback of these prior art RF relays is their cost, as they are substantially more expensive than other types of relays. A low cost relay having improved isolation loss when used at even high frequencies, and that is compact and usable with printed circuit board applications would be an improvement over the prior art.

SUMMARY OF THE INVENTION

There is provided herein an improved RF antenna switch using a low cost, single pole, double throw relay having substantially improved isolation loss. A unique circuit topology using two single-pole, double-throw relays and an additional impedance shunting the receiver input during transmit substantially improves isolation loss of an antenna switch using such relays.

In the transmit position, the common node of a first relay connects the antenna to the transmitter; other contacts of a second relay connect a small resistance in parallel with the input of the receiver to ground potential, thereby increasing the isolation loss of the relay. In the receive position, the relay is wired to connect the input of the receiver directly to the antenna, leaving the output of the transmitter open-circuited.

The small resistance across the input of the receiver during transmit shunts signals coupled to the receiver by stray capacitance to ground. This small resistance couples RF energy to ground that would otherwise be input into the receiver.

DETAILED DESCRIPTION OF THE PREFERRED EMBODIMENT

Figure 1:
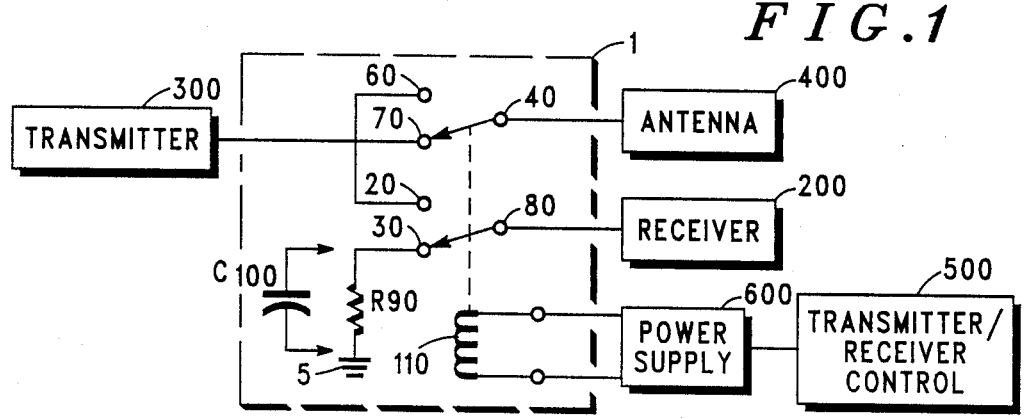
FIG. 1 shows a diagram of an improved antenna switch in the transmit position.

Referring to FIG. 1, there is shown an improved antenna switch (1). The antenna switch (1) connects either a transmitter (300) or a receiver (200) to an antenna (400) using relays. A transmitter/receiver controller (500) that controls a power supply (600) might be used to control current to the windings (110) of the antenna switch (1) comprised of relays. Current in the windings (110) of the relays controls whether the transmitter or receiver is connected to the antenna.

In FIG. 1, the antenna switch (1) is in the transmit position. Signals from the transmitter (300) are conducted through two relay contacts (70 and 40) to the antenna (400). In this position, the antenna switch (1) connects the input of the receiver (200) to ground (5) through a resistance ($R_{90}$) electrically parallel to the input impedance of the receiver (200). The resistance ($R_{90}$) in parallel to the receiver's input increases the isolation loss of the antenna switch (1). (A reactive element, such as a capacitor ($C_{100}$) might be used in combination with the external resistor ($R_{90}$) for impedance matching purposes.)

Figure 2:
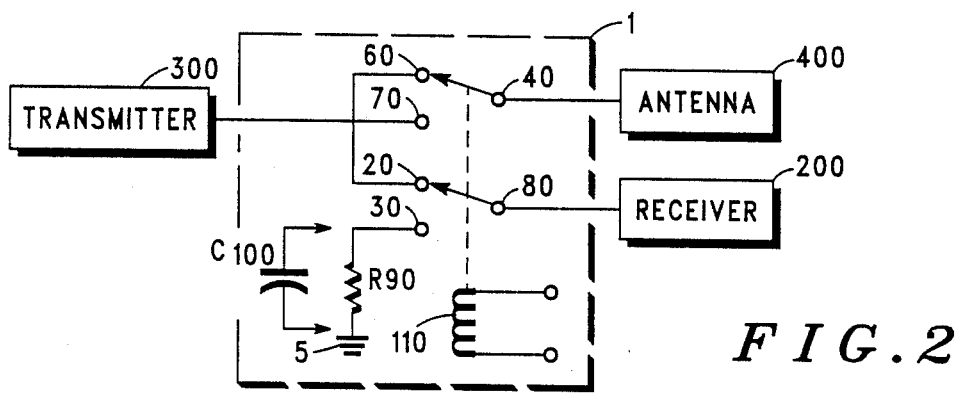
FIG. 2 shows the improved antenna switch in the receive position.

In FIG. 2, the antenna switch (1) is in the receive position. The antenna (400) is connected to the receiver (200) by the connection existing between relay contacts (60 and 20). In this position the transmitter is connected to a relay contact (70) that is an open circuit. When in the receive position the output of the transmitter is simultaneously disabled ($C_{100}$ or other reactive elements used for impedance matching when the receiver is disabled would remain coupled to $R_{90}$ when the antenna switch is in the receive position.).

Figure 3:
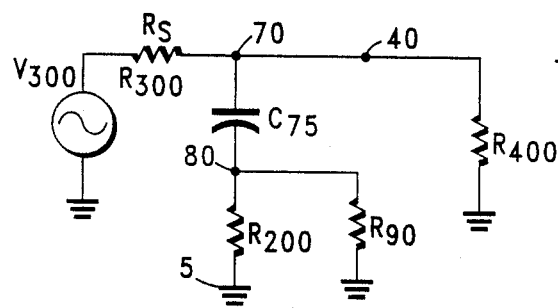
FIG. 3 shows an equivalent diagram of the circuit shown in FIG. 1.

Achieving improved isolation loss can be understood by an analysis of the equivalent circuit diagram shown in FIG. 3. The stray capacitance ($C_{75}$), which affects isolation loss, is shown between two of the relay contacts (70 and 80). A voltage source ($V_{300}$), representing the output voltage of the transmitter (300) and its output impedance ($R_{300}$), is also shown. The antenna impedance is represented by a fifty ohm resistance ($R_{400}$). The input impedance of the receiver (200) is shown as a resistor ($R_{200}$). The resistance at the lower contact (30) of the antenna switch (1) is shown as a resistor ($R_{90}$).

Figure 4:
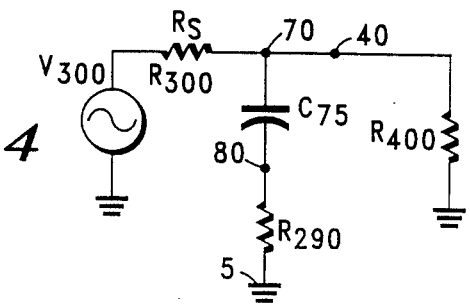
FIG. 4 shows a simplified diagram of the circuit of FIG. 3.

In FIG. 4, the circuit of FIG. 3 is simplified. The parallel resistances of the receiver's input impedance ($R_{200}$) and the antenna switch resistance ($R_{90}$), are shown as a single resistor ($R_{290}$)

To measure isolation loss, the voltage appearing at the receiver's input (the voltage at contact 80) may be calculated using the equivalent circuit shown in FIG. 4. In this figure the voltage appearing at the input of the receiver (200) would be the voltage appearing at contact 80, ($V_{80}$) which is the node between the capacitor ($C_{75}$) and $R_{290}$. The voltage at this node 80 can be determined using a simple voltage divider equation using the voltage at the transmitter's output, the node at contact 70, as the input voltage to a divider comprised of the stray capacitance ($C_{75}$) and ($R_{290}$).

The voltage at the receiver (200) is:

$$V_{80} = V_{70} \cdot \frac{R_{290}}{R_{290} - jXC_{75}}$$

where $V_{70}$ is the voltage at node 70, which is the output voltage of the transmitter, where $V_{80}$ is the voltage at node 80, which is the input terminal to the receiver, where $jXC_{75}$ is the imaginary portion of a complex number representing the impedance of the capacitor at a particular frequency and where $R_{290}$ is a real number, the parallel resistance of the input impedance of the receiver and the resistance ($R_{90}$) connected across the input of the receiver.

Dividing this equation by the voltage at node 70, $V_{70}$ yields a voltage transfer function well known to those skilled in the art:

$$V_{80}/V_{70} = \frac{R_{290}}{R_{290} - jXC_{75}}$$

where $V_{70}$ and $V_{80}$ are as defined above. The isolation loss expressed in decibels is:

$$\text{Isolation dB} = -20 \times \log \frac{R_{290}}{[(R_{290})^2 + (XC_{75})^2]^{\frac{1}{2}}}$$

Since $R_{290}$ is the parallel combination of the external resistance ($R_{90}$) and the input impedance of the receiver ($R_{200}$), decreasing the external resistance ($R_{90}$) decreases $R_{290}$. It can be seen from this equation that decreasing the value of $R_{90}$ substantially increases the isolation loss of the circuit shown in FIG. 1 and FIG. 2. As the value of $R_{90}$ decreases, the isolation loss of the circuit increases substantially.

In at least one alternate embodiment, a reactive element which is preferably a capacitor, ($C_{100}$) as shown in FIG. 2 can optionally be used across the external resistor (R90) for impedance matching purposes.

Using the circuit disclosed above, low cost, two form, C relays, as they are known in the art, can be used with substantially higher isolation losses when used at frequencies as high as 800 MHz.

What is claimed is:

1. An antenna switch coupling an antenna alternatively to a receiver, having an input, and a transmitter, having at least an output, said antenna switch providing improved isolation loss between said transmitter and receiver, said antenna switch comprising;
   first and second relays, each of said first and second relays having at least one common contact and at least first and second switched contacts, said common contacts being alternately coupled to either said first or second switched contacts, said receiver input being coupled to the common contact of said first relay, said antenna being coupled to the common contact of the second relay, said transmitter being coupled to the first switched contact of said second relay, said second switched contact of said second relay being coupled to said second switched contact of said first relay, a non-zero impedance being coupled to the first switched contact of said first relay and to a reference potential node for said antenna switch, said first and second relays having first and second states, said first state coupling said antenna to said transmitter and coupling said input of said receiver to said reference potential through said non-zero impedance, said second state coupling the input of said receiver to said antenna and disconnecting said transmitter from said antenna before said receiver is coupled to said antenna.

2. The antenna switch of claim 1 where said non-zero impedance is a resistor.

3. The antenna switch of claim 1 where said relays are double-pole, single-throw relays.

4. An antenna switch coupling an antenna alternatively to a receiver, having an input, and a transmitter, having an output, said antenna switch providing improved isolation loss between said receiver and transmitter, said switch comprising;
   at least first and second relays each comprising;
      at least three contacts, comprising first and second switch contacts and a common contact; and
      a relay armature movable between said first and second switch contacts for coupling said common contact to either said first or said second switch contacts;
   means for coupling said second switch contact of said first relay means to said second switch contact of said second relay means; and
   means for coupling said antenna to said common contact of said first relay;
   means for coupling said receiver input to said common contact of said second relay;
   means for coupling said transmitter output to said first switch contact of said first relay;
   means for coupling said first switch contact of said second relay to ground potential through an impedance;
   means for moving both said relay armatures of said first and second relay means between said first and second switch contacts of said respective first and second relay means, thereby substantially simultaneously coupling said antenna coupled to said common contact of said first relay means to either said transmitter coupled to said first switch contact of said first relay or a receiver coupled to said common contact of said second relay, said receiver input being coupled to ground potential through said impedance when said transmitter is coupled to said antenna thereby improving isolation between said transmitter and receiver.

5. The antenna switch of claim 4 where said impedance is a resistor.

6. The antenna switch of claim 4 further comprising a capacitor coupled between said first switch contact of said second relay means and said ground potential.

* * * * *